3,350,310
PREPARATION OF OVERBASED CALCIUM ALKYLPHENATE SULFIDES
Richard S. Herd, Woodbury, Emil Koft, Jr., Woodbury Heights, and Ferdinand P. Otto, Woodbury, N.J., assignors to Mobil Oil Corporation, a corporation of New York
No Drawing. Filed Oct. 21, 1965, Ser. No. 500,258
21 Claims. (Cl. 252—42.7)

This invention relates to a method for preparing organometal additive compounds for lubricating oils and in particular it relates to improved methods for producing oil-dispersible basic metal lubricant additives. This application is a continuation-in-part of application Ser. No. 431,152, filed on Feb. 8, 1965, now abandoned.

Lubricating oil compositions are generally blended with additives, such as detergents and antioxidants, to withstand the deleterious conditions encountered in today's engines, particularly in diesel engines. Modern lubricating oils must not only be able to lubricate the working parts of the engine, they must also disperse sludge-like residues which form by virtue of the consumption of the fuel, the introduction of impurities, or the oxidation of the oil itself. Concomitant with these requirements, lubricating oils are required to neutralize the corrosive acids which form because of these conditions. Oil additives which are chemically basic are therefore preferred.

Alkali metal or alkaline earth metal compounds either in the form of oil-soluble organic salts or oil-dispersible compounds have long been sought. However, it has been found, that with respect to soluble salts, normal organometal salts are insufficiently basic to satisfy engine conditions over extended operating periods. It is believed that the more metal compound that can be dissolved or stably dispersed in oil, the more effective acid-neutralizing qualities are obtained. Hence, it has been desired in the past to increase the metal content in oil over that of the normal salts. For example, in U.S. Patent No. 2,956,018, there is disclosed a method of preparing stable metal dispersions in oil by first passing carbon dioxide through an aqueous mixture of a metal compound, such as calcium hydroxide, and excess methanol in the presence of 0.5 to 1.0 mole of water per mole of metal compound. The product of that reaction is then dispersed in an oil containing a high molecular weight oil-soluble sulfonic acid dispersing agent.

Owing to the fact that they are weaker acids than the sulfonic acids, alkylphenol sulfides are less readily reacted with metal compounds to produce highly basic products. In U.S. Patent No. 3,036,971, a calcium alkylphenate salt is prepared in the presence of a glycol and then carbonated to produce a basic phenate salt containing an excess of calcium. However, the necessity of thereafter removing the high-boiling glycol is costly and time consuming.

It is a major object of this invention to prepare sulfurized calcium alkylphenate compositions containing an excess of calcium. Another object of this invention is to provide a method for preparing basic sulfurized calcium alkylphenate compositions by a simple reaction process. Another object is to prepare basic sulfurized calcium alkylphenates for use in clear lubricating oil blends. A further object is to obtain detergent oil blends having improved storage stability, water stability, and antifoaming properties. Another object is to provide highly overbased sulfurized calcium alkyl phenates which are readily dispersible in lubricating oils.

The aforementioned and other objects are achieved by reacting an anhydrous mixture of carbon dioxide, calcium oxide and methanol together at a temperature in the range of about 10° to 65° C., maintaining the molar ratio of carbon dioxide to calcium oxide in the range of 0.4 to 0.8; by mixing the product of this reaction with an alkylphenol sulfide; and then by heating the reaction mixture to a temperature in the range of about 125° to 175° C., preferably at least about 150° C., whereby the methanol is distilled off.

We have found that by following the conditions of this invention, sulfurized basic calcium alkyl phenate products, also referred to hereinafter as "overbased" salts, which are suitable as detergents for lubricating compositions may be readily prepared. The resulting phenate salts moreover have excellent stability and they form extremely clear blends with the usual lubricating oils.

According to the methods of this invention the anhydrous reaction mixture of calcium oxide, methanol and carbon dioxide may be prepared as a first step to form a calcium reagent. Step 2 then involves mixing the reagent of Step 1 with the alkylphenol sulfide in the presence of a suitable diluent. The reaction mass is then subjected to a heating treatment at the higher temperature, preferably at least about 150° C. It is also preferred to limit the Step 1 temperature to a range of 10° to 30° C.

We find that the calcium reagent can also be prepared in the presence of the alkylphenol sulfide, by a one-step method wherein the entire reaction mass components of the two steps disclosed above are mixed together. The temperature of the initial reaction may then range from 10° to 65° C. This alternative procedure will be described subsequently. Regardless of which variation of the method of this invention is employed in the formation of the calcium alkylphenate, the mole ratio of carbon dioxide to calcium of 0.4 to 0.8 must always be maintained.

By using the conditions of this invention, the quantity of calcium which can be uniformly combined in clear oil blends is extremely high. It has been unexpected to find that to obtain such uniform overbased calcium compositions the maximum mole ratio of carbon dioxide to calcium in forming the initial calcium reagent is 0.8. If this ratio is exceeded, the storage stability of the final product blended in the lubricating oil is poor, the blends become hazy and some calcium values may even be lost. The preferred ratio therefore is between 0.5 to 0.75 to insure optimum storage characteristics.

The first step, that of reacting carbon dioxide, calcium oxide and methanol in an anhydrous mixture results in the formation of a carbonated calcium methylate sol. This reaction is conducted at a temperature in the range of 10° to 30° C. and preferably between 15° and 25° C. The calcium oxide and the methanol may be first stirred together in a reactor and this mixture cooled. During the stirring and cooling, carbon dioxide gas is passed through at the maximum rate that can be taken up by the reaction mixture. In other words, carbonation may be conducted by using any convenient conditions which permit the maximum amount of carbon dioxide to be taken up by the reaction mass until the desired mole ratio of $CO_2$/Ca is obtained. When the reaction product of this step has been prepared, the alkylphenol sulfide is added, in the presence of an inert diluent, preferably a mineral oil, and the mixture is heated under agitation to remove the methanol by distillation. The temperature at this point is maintained in the range of about 125° to 175° C., and preferably about 150° C., for at least about one hour. The remaining product is filtered as the only treatment required prior to use in lubricating compositions.

A preferred variation of this method includes a second carbonation treatment. In the first step, the amount of carbon dioxide is added to the calcium oxide and methanol, whereby the maximum molar ratio of carbon dioxide to calcium oxide is about 0.8. The thus-formed calcium reagent is then reacted with the alkylphenol sulfide in the usual manner. After the methanol has been removed, the reaction product is subjected to further carbonation. However, while the total amount of carbon dioxide added in both steps need not be within the overall range of 0.4 to 0.8, it is preferred to maintain the 0.8 maximum limit. We have found that this "after-carbonation" step not only provides improved storage stability of the product in the lubricating oil, but also increases the water stability characteristics of lubricating oil compositions containing the carbonated calcium alkylphenate. This property is of great importance in marine diesel uses.

The sulfurized alkylphenols used as a starting material in the second step of this invention are derived from substituted phenols wherein the substituents on the aromatic nucleus is a hydrocarbon radical which may be cyclic or acyclic, saturated or unsaturated, having from 4 to 30 carbon atoms, there being from 1 to 5 substituents. The term "phenols" is meant to include phenols, naphthols and other hydroxy aromatic compounds; the phenol however is preferred in this invention. The term "alkyl" not only includes alkyl radicals such as butyl, hexyl, octyl, decyl, dodecyl, hexadecyl; but also radicals containing chlorine, bromine, oxygen, or nitrogen; petroleum-based, such as white oil or wax; polyolefinic, such as polypropylene; and aryl, such as phenyl, naphthyl, phenyldecyl, amylphenyl. The sulfurized alkylphenols, also termed alkylphenol sulfides, preferably have a single ring substitution of from 8 to 16 carbon atoms. The percent of sulfur present in the alkylphenol sulfide is at least about 5% and may range to over 15%. The nonylphenol sulfide and dodecylphenol sulfide provide excellent lubricating oil detergents and are the preferred reactants in this invention, such as described in U.S. Patent 2,916,454, wherein the phenol to sulphur reagent mole ratio is from 1:1 to 2:1.

With respect to the calcium oxide used according to the method of this invention, we may employ an anhydrous calcium oxide, having a mesh size of from 30 to 325, and more preferably from 98 to 325. We have observed that the ratio of carbon dioxide taken up in the calcium oxide-methanol mixture is relatively the same between about 98 mesh and just below 325 mesh. However, at about 325 mesh the uptake is trebled. At particle sizes below 98 mesh the rate of carbon dioxide uptake tends to be low. Thus it is preferred that the calcium oxide have a minimum mesh size of about 98. The calcium oxide used in the examples hereinbelow is of technical grade and contains about 97.5% calcium oxide.

As indicated heretofore in conducting the reaction it is desirable to incorporate an organic diluent in the second reaction mixture, such as benzene, chlorobenzene, or toluene, which is normally inert to the reactants. For this purpose, we prefer to use a process oil diluent, inasmuch as the resulting concentrated oil blend containing the final product is then readily usable as a base mixture for the preparation of useful lubricating oil compositions. Also, the presence of the mineral oil effectively decreases the viscosity of the mixture and facilitates the handling thereof.

Process oils which may be used for this purpose include a wide variety of mineral oils, such as naphthenic or paraffinic oils; alkylene polymers, such as polypropylene; and ester oils of polycarboxylic acids, and phosphoric acids. The most preferred process oil used is a conventional paraffinic oil having a viscosity of about 100 SUS at 100° F.

In the one-step, or in situ procedure, according to this invention, the calcium oxide, methanol, and the alkylphenol sulfide are mixed together, preferably in the presene of either an inert organic solvent or process oil, or a combination of both. While the mixture is being agitated, carbon dioxide is passed through, thus forming the calcium reagent in the presence of the alkylphenol sulfide. If some inert diluent is present the temperature can range as high as 60° during the carbonation, and thus cooling the reaction mixture in this case is unnecessary. If the reaction is performed without the small amount of any inert liquid present, the reaction temperature is limited to the aforesaid maximum of 30° C. We prefer to have about 0.3 to 1.0 part by weight of the mineral oil diluent per part of the alkylphenol sulfide present during carbonation in this alternative procedure.

By this in situ procedure overbased alkylphenol sulfides containing either a moderate amount or an extremely high amount of calcium may be prepared. However, it has been discovered that the more highly overbased salts cannot be readily prepared without the presence of an inert, organic co-solvent. This co-solvent possesses mutual solvency for the methanol, the process oil if present and the overbased salt. While many organic solvents may be used in preparing these more highly overbased salts, it is preferred to use aliphatic or aromatic hydrocarbons, halogenated aromatic hydrocarbons, and alkylated aromatic hydrocarbons, including especially chlorobenzene, carbon tetrachloride, and xylene. The substituted aromatic hydrocarbons may contain up to 6 substituents, the alkyl substituents having from 1 to about 10 carbon atoms. In this modification of the in situ procedure the carbonation is performed in the temperature range of about 10° to about 65° C., and preferably 40° to 55° C. The carbon dioxide-calcium mole ratio is maintained in the range as indicated in this invention.

The total carbonation time in both procedures may take from about 20 minutes to about 8 hours depending upon the rate or the quantity of carbon dioxide introduced.

After the reaction mass is carbonated, if oil is present, the temperature is increased to at least about 150° C. distilling off the methanol and solvent the remaining liquid is filtered to yield the finished product. If oil is omitted in the reaction, e.g. the co-solvent is used alone, the methanol is distilled off from about 80° to 125° C., and the remaining solution is filtered to remove solids. Thereafter, a process oil is added and the co-solvent is removed by distillation. In either case, the final product is in a homogeneous mixture with the process oil.

The following examples are designed to illustrate without limitation the preparation of basic calcium salts of sulfurized alkylphenols having a high calcium content according to our invention. In the examples, reference is made to the total base number of the salt (TBN) which denotes the calcium content. These numbers have been found by titrating the product with perchloric acid, the base number being reported in terms of milligrams of KOH per gram of sample. Any mention hereinafter to parts or percent refers to a weight basis unless otherwise specified.

EXAMPLE 1

Into a 2-liter four-necked round bottom flask equipped with a mechanical stirrer, a gas inlet tube, a thermometer and a water cooled condenser were added 46 grams (0.80 mole) of calcium oxide of 98 to 300 mesh (97.5% CaO) and 395 ml. of anhydrous methanol. The mixture was stirred and cooled in a continuous water bath at a temperature of 17.5° C. Carbon dioxide gas was added directly into the mixture at that temperature at a rate of 1.4 cubic feet per hour for 17 minutes. The amount of carbon dioxide uptake in the mixture was 18 grams (0.409 mole) representing a mole ratio of $CO_2/Ca$ of 0.51.

To the above reaction mixture was added a mixture containing 155 grams of nonylphenol sulfide (9.8% sulfur and 4.34 active hydrogen number) and 345 grams of a mineral oil (solvent-refined base stock). The mixture was then heated until methanol began to distill off. At a temperature of 100° C. the reaction contents were blown by nitrogen gas. The temperature was increased to 150° C. and held for one hour. The remaining reaction product was treated with 25 grams of a diatomaceous earth filter aid and filtered through a heated Buchner funnel. The filtration rate was extremely rapid yielding 481 grams of product having the following analysis:

| | |
|---|---|
| Calcium _____ percent__ | 4.67 |
| Sulfur _____ do____ | 2.89 |
| Carbon dioxide _____ do____ | 3.4 |
| TBN _____ | 130 |
| Kinematic viscosity at 210° F. cs. _____ | 17.32 |

EXAMPLE 2

The procedure of Example 1 was repeated except that the amounts of the compounds used were doubled. The time for carbonation in the first step was 20 minutes yielding an uptake of 40 grams (0.91 mole) of carbon dioxide. This represented a $CO_2/Ca$ mole ratio of 0.74. After reacting with the nonylphenol sulfide and treating the reaction mixture as in Example 1, the remaining product had the following analysis:

| | |
|---|---|
| Calcium _____ percent__ | 4.02 |
| Sulfur _____ do____ | 2.81 |
| Carbon dioxide _____ do____ | 2.6 |
| TBN _____ | 112 |
| Kv. at 210° F. cs. _____ | 16.40 |

EXAMPLE 3

Using the same procedure as in Example 1 the $CO_2/Ca$ mole ratio in this case was 0.96. In step 2, instead of using 345 grams of mineral oil, 155 grams were used. The products so produced had the following analysis:

| | |
|---|---|
| Calcium _____ percent__ | 5.70 |
| Sulfur _____ do____ | 4.73 |
| Carbon dioxide _____ do____ | 3.2 |
| TBN _____ | 158 |
| Kv. at 210° F. cs. _____ | 97.11 |

EXAMPLE 4

Into a reactor similar to that used in Example 1 were added 46 grams (0.8 mole) of calcium oxide and 395 ml. of anhydrous methanol. The mixture was stirred and cooled to a temperature of 18° C. and carbonated at a rate of 1.4 cubic feet per hour for 18 minutes. The carbon dioxide uptake was 19 grams (0.432 mole) representing a $CO_2/Ca$ mole ratio of 0.54.

A mixture containing 182 grams of dodecylphenol sulfide (8.64% sulfur, 3.13% active hydrogen) and 273 grams of a solvent-refined mineral oil was added to the flask containing the above calcium reagent. The temperature was increased until methanol began to distill off. Nitrogen gas was blown through the reactor when the temperature reached about 100° C. The mixture was held at a temperature of 150° C. for one hour. The residual product (about 531 grams) was treated with diatomaceous earth filter aid and filtered through a Buchner funnel. The filtration rate was very fast and yielded 419 grams of product having the following analysis:

| | |
|---|---|
| Calcium _____ percent__ | 4.87 |
| Sulfur _____ do____ | 3.35 |
| Carbon dioxide _____ do____ | 3.7 |
| TBN _____ | 141 |
| Kv. at 21° F. cs. _____ | 33.28 |

EXAMPLE 5

Using the same procedure as in Example 4, the carbonation time was 20 minutes, yielding an uptake of carbon dioxide of 28 grams (0.635 mole). The $Co_2/Ca$ mole ratio was 0.79. After reacting the resulting calcium reagent with the dodecylphenol sulfide and treating the reaction mixture as in the above examples, the remaining product had the following analysis:

| | |
|---|---|
| Calcium _____ percent__ | 5.08 |
| Sulfur _____ do____ | 3.31 |
| Carbon dioxide _____ do____ | 3.5 |
| TBN _____ | 144 |
| Kv. at 210° F. cs. _____ | 29.58 |

Evaluation of products—Examples 1 to 5

STORAGE CLARITY TEST

The products of the above examples were tested in the storage clarity test. The additives in these oil concentrates are blended into solvent-refined coastal mineral oil base stocks to form a mixture sufficient to give a TBN of 40 (usually about 25% to 30% by weight of the oil concentrate). The base stocks contained two oils in a 60/40 weight ratio having the following properties:

| | Oil 1 | Oil 2 |
|---|---|---|
| Parts, by weight | 60 | 40 |
| Spec. Grav., °API | 24.8 | 23.1 |
| Pour Point, °F | 0 | 35 |

Each blend is held at room temperature, both in an artificially lighted room and in a darkened room, and at a 130° F. in an artificially lighted room. The blend is allowed to stand for 28 days and thereafter observed for amount of haze or precipitation.

| Ex. No. | Alkyl substituent of phenol sulfide reactant | $CO_2/Ca$, mole ratio | Precipitation After 28 Days | | |
|---|---|---|---|---|---|
| | | | RT light | RT dark | 130° F. light |
| 1 | Nonyl | 0.52 | None | None | None. |
| 2 | ___do___ | 0.74 | ___do___ | ___do___ | Light. |
| 3 | ___do___ | 0.96 | (¹) | (¹) | (¹). |
| 4 | Dodecyl | 0.54 | None | None | Trace. |
| 5 | ___do___ | 0.79 | Trace | Trace | Light. |

¹ Oil blends very hazy.

CFR Diesel Engine

DETERGENCY DISPERSANCY TEST

The CFR Engine Test tests the detergency of the sample lubricant. It is operated by using an engine under operating conditions both described as follows:

(I) Engine:

Single cylinder, four stroke cycle CFR engine modified wtih a Comet diesel head
Bore: 3¼ inches
Displacement: 37.3 cubic inches
Compression ratio: 17:1
HP output: 6
Crankcase oil: 2500 ml.+1000 ml. for the filter (II) Operating conditions:

| | |
|---|---|
| R.p.m. _____ | 1800. |
| Intake air temp., ° F. ___ | 50″ Hg absolute, intake air |
| Fuel rate, lb./hr.. _____ | 200±5. |
| Smoke level _____ | 5.8. |
| Smoke level _____ | 6. |
| Blowby _____ | 55-60 cf.hr.¹. |
| Coolant temp., ° F. _____ | 212. |
| Oil temp., ° F. _____ | 225. |
| Oil charge, including filter, ml. _____ | 3500. |
| Filtration system _____ | Full-flow. |
| Filter size, cu. in. _____ | 55. |
| Test duration, hrs. _____ | 80. |
| Test fuel _____ | Special residual ² diesel fuel (2% S). |
| Break-in procedure _____ | 3 hr. break-in with base oil and filter disconnected. Oil changed and filter connected before test. |

¹ High blowby obtained by using four scraper compression rings and a ventilated oil ring.
² Special diesel fuel containing 50% #6 residual fuel.

| | |
|---|---|
| SUS @ 100° F. _____ | 105 |
| Sulfur _____ percent__ | 2 |
| Carbon residue _____ do____ | 7 |

Distillation:
 10% @ 424° F.
 70% may be distilled before cracking.

A product prepared according to the procedure of Example 1 was tested under the above conditions. This product had the following analysis.

Calcium _____ percent__ 4.45
Carbon dioxide _____ 2.80
TBN _____ 133

This product was mixed with the mixture of solvent-refined coastal stock used in the Storage Clarity test (60% by weight of a 520 SUV at 100° F. and 40% by weight of a 3300 SUV at 100° F.) to produce a blend containing 31.7% of the above product. After the run was completed the engine was taken apart and the pistons were checked for overall cleanliness. In this test a rating of 90% or above is considered excellent. In this case the overall piston rating was 92.3%.

EXAMPLE 6

A product prepared in a manner similar to that of Example 1 had the following analysis:

Calcium _____ percent__ 4.45
Carbon dioxide _____ do____ 2.80
TBN _____ 133

It was treated with a further amount of carbon dioxide. A total of 2.5 grams (0.057 mole) of carbon dioxide was added to 500 grams of the calcium nonylphenol sulfide over a period of one hour at 150° C. No filtration was necessary. The analysis of this product was as follows:

Calcium _____ percent__ 4.45
Carbon dioxide _____ do____ 3.4
TBN _____ 132

This product was blended in oil and subjected to a water stability test. In this test 50 grams of a solvent-refined oil mixture similar to that used in the above Storage Clarity test is blended with a sufficient amount of the additive to provide a base number of 40. The blend sample is mixed with 5% by volume of water and shaken in a mechanical shaker for three minutes at approximately 600 cycles per minute. The material is allowed to settle for 24 hours. On the basis of volume percent of clear oil, hazy material, solid precipitation and water, various blends are rated. If 95% by volume of the oil blend is clear, the blend is considered good. If any water separates out of the remaining 5% phase the blend is rated as excellent. Oil blends containing the salt prepared by the procedure of Example 6 had excellent water stability characteristics.

The after-carbonated product of Example 6 in the 40-TBN oil blend (termed "Product B") used in the Storage Clarity test was tested in the Foam Test (ASTM D 892, Sequence #1). The sample is held at a temperature of 75° F. and blown with air at a constant rate for 5 minutes and allowed to stand for 10 minutes. The volume of foam is measured in milliters at the end of both periods. A product prepared in a manner similar to that of Example 1 (termed "Product A") was also tested in a 40-TBN oil blend for comparison purposes. The oil blends are combined with a methyl silicone polymer fluid defoamant. In the table below, FT stands for foaming tendency (after 5 minutes of blowing) and FS stands for foam stability (after 10 minutes of standing).

FOAMING TEST (SEQ. 1) AT 75° F.

| Product | FT, ml. | FS, ml. |
|---|---|---|
| Product A and 200 p.p.m. silicone | 480 | 230 |
| Product B and 200 p.p.m. silicone | 270 | 90 |

The above results indicate a surprisingly substantial improvement in the anti-foaming characteristics of oil blends containing calcium alkylphenol sulfides made according to this invention which have been further treated with carbon dioxide.

Examples 1 to 6 illustrate the two-step procedure of this invention and the after-carbonation variation thereof. The following examples are typical one-step procedures.

EXAMPLE 7

A solution containing 155 grams of nonylphenol sulfide and 400 ml. of anhydrous methanol was prepared in a two-liter four-necked reaction flask equipped with a stirring mechanism, a thermometer, a condenser and a gas inlet tube. To this solution were added 46 grams (0.8 mole) of calcium oxide. The mixture was stirred and maintained at a temperature of between 19° and 23° C. Carbon dioxide was added at a rate of 400 ml. per minute. The carbonation was continued for 22 minutes, until the reaction mixture had taken up 18 grams (0.409 mole) of carbon dioxide. This is a molar ratio of 0.5 $CO_2$/Ca. At this point, 295 grams of a solvent-refined mineral oil were added and the reaction mixture was brought to a temperature of 150° C., thereby stripping off the methanol. The reaction flask was sparged with nitrogen gas. Using a diatomaceous earth filter aid the residual reaction mixture was filtered through a heated Buchner funnel to yield 456 grams of product having the following analysis.

Calcium _____ percent__ 5.25
Carbon dioxide _____ do____ 2.1
TBN _____ 147

The procedure of Example 7 was twice repeated using higher $CO_2$/Ca mole ratios: (a) the mole ratio was increased to 0.89 and (b) the mole ratio was increased to 1.60. In both cases the additive had very poor stability in oil.

EXAMPLE 8

The procedure of Example 7 was repeated using a carbonation temperature of 22° to 24° C. over a 22 minute period. The mole ratio of $CO_2$/Ca was about 0.53. The yield was 455 grams of a product having the following analysis:

Calcium _____ percent__ 4.86
Carbon dioxide _____ do____ 4.0
TBN _____ 141

EXAMPLE 9

Following the procedure of Example 7, the carbonation was conducted for 20 minutes to yield a $CO_2$/Ca mole ratio of 0.47. The carbonation temperature was in the range of 21° to 26° C. In this example, the initial reaction mixture contained about 100 grams of the mineral oil; another 195 grams of oil were added after carbonation. A yield of 439 grams was obtained, the product having the following analysis:

Calcium _____ percent__ 4.52
Carbon dioxide _____ do____ 3.0
TBN _____ 123

EXAMPLE 10

Following the procedure of Example 9 except that no cooling means were applied to the reaction mixture, the carbonation was conducted for about 22 minutes during which time the temperature range increased from 30° C. to 53.5° C. Approximately 18 grams of carbon dioxide were taken up in the reaction mass. In this example, as in Example 9, approximately 100 grams of the mineral oil had been added prior to carbonation; thereafter the remaining amount was added. The yield of product was 448 grams and had the following analysis:

Calcium _____ percent__ 5.02
Carbon dioxide _____ do____ 2.91
TBN _____ 136

EXAMPLE 11

The procedure of Example 10 was repeated except that the amounts of components were doubled and the quantity of methanol was increased 1.75 times. The reaction temperature during carbonation ranged from 28° to 55° C. over a 45 minute period. About 36 grams of carbon dioxide were taken up in the mixture. A yield of 938 grams of product was obtained having the following analysis:

| | |
|---|---|
| Calcium _____percent__ | 5.25 |
| Carbon dioxide _____do____ | 3.5 |
| TBN _____ | 144 |

EXAMPLE 12

The procedures and amounts of Example 8 were repeated except that 30% less mineral oil was added after the carbonation step. In this example also the $CO_2/Ca$ ratio was about 0.53. The reaction began at a temperature in the range of 26.5° to 29° C.; during carbonation the maximum temperature reached 55° C. The carbonation took 45 minutes with a carbon dioxide uptake of about 38 grams. A yield of 822 grams was obtained, the product having the following analysis:

| | |
|---|---|
| Calcium _____percent__ | 5.9 |
| Carbon dioxide _____do____ | 3.9 |
| TBN _____ | 165 |

EXAMPLE 13

A solution of 155 grams of nonylphenol sulfide, 400 ml. of anhydrous methanol and 295 grams of a solvent-refined mineral oil was prepared in a reactor similar to that used in the above examples. To this solution with stirring was added 46 grams (0.81 mole) of calcium oxide. Without applying temperature controls to the reaction vessel, carbon dioxide was passed into the reactor at a rate of 400 ml. per minute for 22 minutes resulting in a carbon dioxide uptake of only 10 grams. As a result, carbonation was continued for 40 minutes longer providing an uptake of 24 grams (.55 mole) yielding a $CO_2/Ca$ mole ratio of about 0.66. The carbonation temperature rose to 48° C. After the methanol was removed 453 grams of a product was obtained with the following analysis:

| | |
|---|---|
| Calcium _____percent__ | 5.25 |
| Carbon dioxide _____do____ | 3.4 |
| TBN _____ | 146 |

The products of Examples 7 to 13 were tested with respect to storage clarity, water stability and antifoaming properties in a base oil blend. As described in the water stability test in Example 6, additives were blended with the same mixture of the two base stocks used in earlier examples to provide a total base number of 40. The storage clarity test, the water stability test, and the foam test are the same in these cases as described earlier.

The test results represented hereinabove indicate that the methods of this invention produce compounds which are useful in providing detergency to lubricating oils. The reaction times are relatively rapid and we find that the use of anhydrous reactants obviates the necessity of removing water from the oil blend without any complicated filtration steps required.

In the following three examples, the calcium oxide content is higher than in the previous examples. It will be noted that the co-solvent is used in these preparations.

EXAMPLE 14

Into a reaction vessel were added 182 grams of dodecylphenol sulfide (as a 50% solution in solvent refined mineral oil) 100 ml. of anhydrous methanol and 100 ml. of chlorobenzene. This mixture was stirred until a homogeneous solution was obtained. Into the solution were added 45 grams (0.79 mole) of calcium oxide. Carbon dioxide was introduced into the reaction vessel at a rate of about 400 ml. per minute for 23 minutes, providing an uptake of 20 grams (0.455 mole) of carbon dioxide. The temperature having been maintained in the range of about 48 to 54° C. The $CO_2/Ca$ mole ratio was about 0.57. The methanol was removed by distillation and 20 grams of a solvent-refined mineral oil were added. The resulting product after filtration had the following analysis:

| | |
|---|---|
| Calcium _____percent__ | 8.61 |
| Carbon dioxide _____do____ | 6.2 |
| TBN _____ | 250 |

The product of this example was tested in the above described water stability test with a rating of excellent.

EXAMPLE 15

Into a reaction vessel were added 145 grams of nonylphenol sulfide (a 53.3% by weight solution in a solvent-refined mineral oil) with 125 ml. of anhydrous methanol and 200 ml. of chlorobenzene, and the mixture was stirred until a homogenous solution was obtained. Into this solution were added 45 grams (0.79 mole) of calcium oxide. Carbon dioxide was introduced into the mixture at a rate of 400 ml. per minute for 20 minutes. The temperature was maintained in the range of 50° to 56° C. The uptake of carbon dioxide by the reaction mixture was 18 grams (0.409 mole) indicating a mole ratio of $CO_2/Ca$ of about 0.51. After the carbonation the methanol was removed by distillation and 55 grams of the solvent-refined mineral oil were added. Methanol stripping was continued to a temperature of 160° C. The product was obtained by filtration through a heated precoated Buchner funnel yielding 185 grams with the following analysis:

| | |
|---|---|
| Calcium _____percent__ | 8.4 |
| TBN _____ | 239 |

| Ex. No. | Storage Clarity Test [1] | | | Overall Rating | Water Stability Test | ASTM FOAM Seq. #1 at Room Temp. with Silicone Fluid | | | |
|---|---|---|---|---|---|---|---|---|---|
| | R.T. Light | R.T. Dark | 130° F. Light | | | 200 p.p.m. | | 50 p.p.m. | |
| | | | | | | 5 Min. Air | 10 Min. Stand | 5 Min. Air | 10 Min. Stand |
| 7 | 1A | 1A | 1C | Pass | Excellent | 410 | 140 | 420 | 330 |
| 7 (a) | 5A | | | Fail | Not run | | | | |
| 7 (b) | ppt | | | do | do | | | | |
| 8 | | | | | do | | | | |
| 9 | 1A | 1A | 1A | Pass | Excellent | 450 | 340 | 430 | 360 |
| 10 | 1A | 1A | 1B | do | do | 150 | 60 | 470 | 140 |
| 11 | 1A | 1A | 1C | do | do | 260 | 130 | 400 | 170 |
| 12 | 1A | 1A | 1B/C | do | do | 410 | 220 | 540 | 450 |
| 13 | 4A | | | Fail | Very good Poor | 490 | 240 | | |

[1] Analysis based on visual degrees of haze and precipitation. An oil containing no worse than a 2C rating passes this test.
1—Clear. 2—Trace. 3—Light. 4—Medium. 5—Hazy.
A—None. B—Trace. C—Light. D—Medium. E—Heavy.

EXAMPLE 16

Into a reaction vessel were added 545 grams of dodecylphenol sulfide (as a 75% by weight solution in chlorobenzene) 250 ml. of anhydrous methanol and an additional 500 ml. of chlorobenzene. This mixture was stirred until a homogeneous solution was obtained. Into the solution was dispersed 200 grams of calcium oxide. Carbon dioxide was introduced into the reaction vessel at a rate of about 400 ml. per minute for 85 minutes, yielding an uptake of 80 grams of carbon dioxide, the temperature having been maintained in the range of 49° to 64° C. The $CO_2/Ca$ mole ratio was about 0.51. The methanol was removed by distillation by heating to 125° C. Process oil, 410 grams, and filter aid, 40 grams, were added and the mixture filtered through a heated precoated Buchner funnel. The filtrate was then heated to 150° C. under reduced pressure of 28 in. Hg gauge, and held for 30 minutes at 150° to 155° C. The finished product analyzed as follows:

| | |
|---|---|
| Calcium | percent 8.4 |
| Carbon dioxide | do 6.3 |
| TBN | 232 |

The concentration of the additives prepared according to this invention in lubricating oils may range from about 0.10% to about 50% by weight of total lubricant composition, depending upon the desired lubricating application.

Our discovery has enabled us to provide stable, clear sulfurized calcium alkylphenate additives for common lubricating oils with up to five alkyl radicals of from 4 to 30 carbon atoms, having base numbers of as high as 300. The percent metal utilization based on the calcium charged obtained by the procedures of this invention is about 85%, by maintaining the carbonation temperature in the range of about 10° to 65° C., preferably 10° to 30° C. for the two-step procedure and up to 65° C. for the one-step, and a mole ratio of carbon dioxide to calcium in the range of 0.4 to 0.8, and preferably 0.5 to 0.75.

The specific embodiments of the invention hereinabove described are not intended as a limitation of this invention except as falling within the scope of the following claims.

We claim:

1. A method of producing an overbased sulfurized calcium alkylphenate comprising (1) reacting an anhydrous mixture of calcium oxide, methanol and carbon dioxide together at a temperature in the range of 10° to 30° C. wherein the ratio of moles of carbon dioxide per mole of calcium is in the range of 0.4 to 0.8, (2) reacting the product of step (1) with an alkylphenol sulfide produced from a phenol and a sulfur reagent at a mole ratio in the range of 1:1 to 2:1 of phenol to sulfur reagent, wherein the alkyl group contains from 4 to 30 carbon atoms, and (3) heating the said reaction mixture at 125° to 175° C. to remove the said methanol by distillation.

2. The method of claim 1 wherein the alkyl group contains from 8 to 16 carbon atoms.

3. The method of claim 1 wherein the alkylphenol sulfide is nonylphenol sulfide.

4. The method of claim 1 wherein the alkylphenol sulfide is dodecylphenol sulfide.

5. The method of claim 1, wherein the mole ratio of carbon dioxide to calcium is in the range of 0.5 to 0.75.

6. The method of claim 1, wherein the product of step (3) is carbonated with additional carbon dioxide as a final step, while maintaining the total of the said mole ratio in the range of 0.4 to 0.8.

7. The method of claim 1, wherein reaction steps (1) and (2) are combined, the alkylphenol sulfide of step (2) being reacted with the calcium oxide, methanol, and carbon dioxide in one step under anhydrous conditions at a temperature in the range of 10° to 65° C.

8. The method of claim 7, wherein the reaction mixture contains a liquid diluent selected from the group consisting of a mineral oil, a synthetic oil, an aliphatic hydrocarbon, a halogenated aliphatic hydrocarbon, an alkylated aromatic hydrocarbon, said aliphatic and alkyl substituents having from 1 to 10 carbon atoms.

9. The method of claim 7 wherein the combined reaction step is conducted at a temperature in the range of 40° to 55° C.

10. The method of claim 8 wherein the liquid diluent is a mineral oil.

11. The method of claim 8, wherein the liquid diluent is chlorobenzene.

12. The method of claim 8 wherein the liquid diluent is a mixture of a mineral oil and chlorobenzene.

13. An oil composition consisting essentially of a major proportion of a lubricating oil and a minor proportion of the product of the method of claim 1.

14. An oil composition consisting essentially of a major proportion of a lubricating oil and a minor proportion of the product of the method of claim 7.

15. The composition of claim 14 wherein the alkylphenol sulfide is nonylphenol sulfide.

16. The composition of claim 14 wherein the alkylphenol sulfide is dodecylphenol sulfide.

17. An overbased sulfurized calcium alkylphenate prepared according to the method of claim 1.

18. An overbased sulfurized calcium alkylphenate prepared according to the method of claim 7.

19. An oil composition consisting essentially of a major proportion of a lubricating oil and a minor proportion of the product of the method of claim 8.

20. An oil composition consisting essentially of a major proportion of a lubricating oil and a minor proportion of the product of the method of claim 11.

21. An overbased sulfurized calcium alkylphenate prepared according to the method of claim 11.

References Cited

UNITED STATES PATENTS

| | | | |
|---|---|---|---|
| 2,870,134 | 1/1959 | Kluge et al. | 252—42.7 |
| 2,916,454 | 12/1959 | Bradley et al. | 252—42.7 |
| 2,956,018 | 10/1960 | Carlyle et al. | 252—42.7 |
| 3,036,971 | 5/1962 | Otto | 252—42.7 |
| 3,082,248 | 3/1963 | Coonradt et al. | 252—42.7 |
| 3,194,761 | 7/1965 | Fox et al. | 252—42.7 |

DANIEL E. WYMAN, *Primary Examiner.*

C. F. DEES, W. H. CANNON, *Assistant Examiners.*